No. 860,838. PATENTED JULY 23, 1907.
H. SPINGLER.
MOISTENER AND CASING FOR PRESS COPYING ROLLERS.
APPLICATION FILED MAY 23, 1905. RENEWED FEB. 11, 1907.
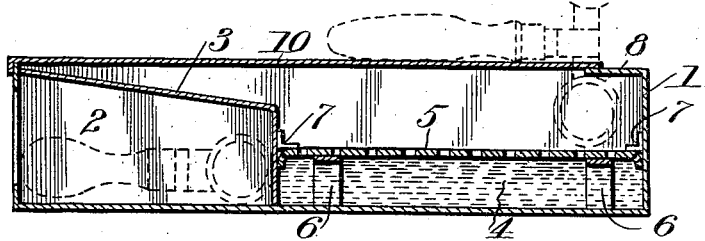
Fig. I.
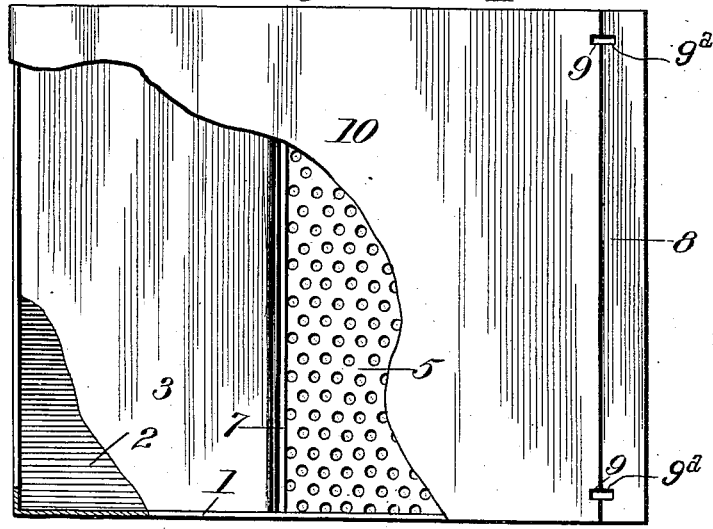
Fig. II.
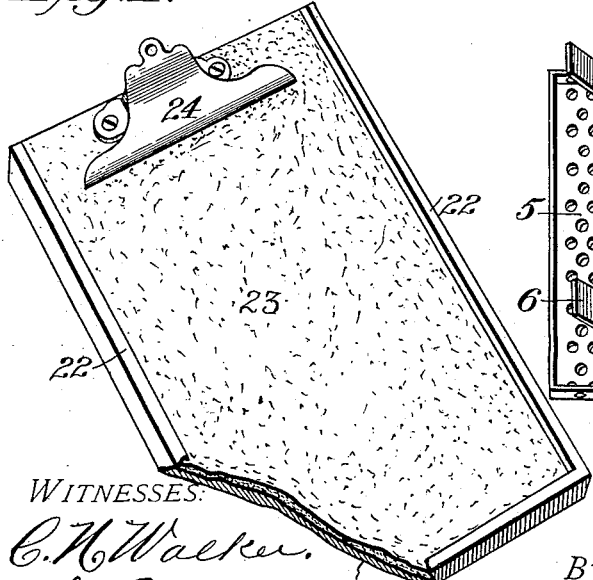
Fig. IV.
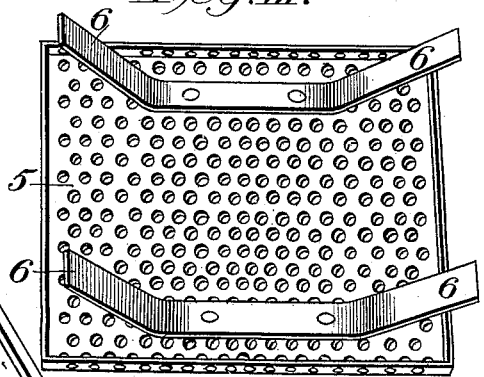
Fig. III.
INVENTOR:
Harry Spingler
WITNESSES:
C. H. Walker
S. R. Brattan
By
Collamer & Co., Attorneys.

UNITED STATES PATENT OFFICE.

HARRY SPINGLER, OF NEW YORK, N. Y.

MOISTENER AND CASING FOR PRESS-COPYING ROLLERS.

No. 860,838.           Specification of Letters Patent.           Patented July 23, 1907.

Application filed May 23, 1905, Serial No. 261,809. Renewed February 11, 1907. Serial No. 356,896.

*To all whom it may concern:*

Be it known that I, HARRY SPINGLER, a citizen of the United States, and a resident of New York, New York county, State of New York, have invented certain new and useful Improvements in Moisteners and Casings for Press-Copying Rollers; and my preferred manner of carrying out the invention is set forth in the following full, clear, and exact description, terminating with a claim particularly specifying the novelty.

This invention relates to devices for copying letters; and the object of the same is to produce a moistener and casing for use in connection with the press-copying roller which forms the subject matter of a companion application filed by me on July 6, 1904 and bearing Serial Number 215,557.

The present invention consists in the construction hereinafter described, and illustrated in the accompanying drawings wherein—

Figure I is a longitudinal section through the casing complete, showing in dotted lines how the rollers can be used in connection therewith. Fig. II is a plan view, with parts broken away. Fig. III is a perspective detail of the moistening plate removed and inverted. Fig. IV is a perspective detail of the absorbent pad or base partly broken away.

The casing of this machine comprises a rectangular box 1, preferably made of metal and with a chamber 2 in one end within which can be placed a roller or rollers when the device is to be stored or shipped. Above this chamber is an inclined drip-board 3 occupying part of the interior of the casing so as to leave the remainder thereof for the water chamber 4. Within the latter is removably inserted the moistening plate 5 which preferably consists of a sheet of perforated metal with down-turned or inturned edges, supported on two springs 6 whose legs hold it normally above the surface of the water in the chamber 4. Cleats 7 within the chamber prevent this plate from displacement, while yet permitting its depression so that it becomes slightly submerged as explained below. The inner end of the casing is turned over on the top for a short distance as shown at 8 and provided with notches 9, and the cover 10 which is entirely removable has corresponding and registering notches 9ª in its inner edge, for a purpose to appear below. The whole is of the proper size and proportions and is preferably of material which will not rust.

The base shown in Fig. IV consists of a body 21 as of wood, preferably having raised flanges 22 around its edges, within which fits a thick sheet 23 of felt or asbestos. 24 is a spring clip whose fastening screws pass through this sheet, and into the body; and the parts are of such a size that tissue sheets of the size of letter paper may be held under the clip and will lie upon the sheet of soft material.

The use of this device is as follows: Water is poured into the casing to about the level indicated in Fig. I, and when the cover is in place its notches complement those in the top of the casing so as to permit the crossbar of a roller to pass through the notches and allow the moistening roller to stand within the damp chamber always keeping it damp and protected from dust. The blotter-roller with a short handle is indicated as stored within the chamber 2. The cover is removed and the moistening roller reciprocated over the plate 5, a slight downward pressure submerges the plate, and the water rising through its perforations moistens the roller. The latter may then be reciprocated over the drip 3 to wring out the excess of moisture. The sheet of tissue to be moistened is inserted beneath the clip 24 and laid flat upon the felt sheet 23. The dampened roller is then drawn downward over this sheet of tissue—the pressure thereof combined with the softness of the roller and of the sheet beneath it, thoroughly distributing the moisture. However, if this operation wets the tissue excessively, the blotter-roller (here illustrated as stored in the compartment 2) may be drawn over the sheet to remove the surplus moisture. The letter sheet is then turned face downward and secured beneath the clip upon the moist tissue, and the pressure roller is drawn once or twice over the back of the letter; when it will be found that an excellent copy has been made upon the tissue No claim on the construction of the rollers is made in this application, but they are illustrated for the purpose of amplifying the uses to which the present invention may be put.

What is claimed as new is:

1. In a device of the character described, a casing containing a storage chamber and a water chamber, a drip board above the former inclined toward the latter, a perforated moistening plate yieldingly supported above the level of the water in the moistening chamber, and cleats therein, for the purpose set forth.

2. In a device of the character described, a casing containing a moistening chamber and having one end at the top turned inward and notched, combined with a removable cover having notches adapted to register with those in the fixed portion of the casing, as and for the purpose set forth.

3. In a device of the character described, the combination with a moistening chamber; of a perforated plate within said chamber, and spring legs supporting the plate normally at a height above the water level, as and for the purpose set forth.

4. In a device of the character described, the combination with a casing containing a storage chamber in one end and a water chamber throughout the remainder of its body, and a moistening plate yieldingly supported within the water chamber and normally above the level of the water therein; of a fixed portion at the top of the casing over one end of the moistening chamber and having notches in its edge, and a removable cover having notches adapted to register with those in the fixed portion, whereby a moistening device may be suspended within the casing above the water.

In testimony whereof I have hereunto subscribed my signature this the 22nd day of May, A. D. 1905.

HARRY SPINGLER.

Witnesses:
THOMAS J. MCKEEVER,
GERALD TUSHAK.